United States Patent [19]

Ikegami

[11] 3,896,263

[45] July 22, 1975

[54] SYSTEM FOR RECORDING PHOTO-IMAGES OF AN OBJECT

[75] Inventor: Yoshizo Ikegami, Amagasaki, Japan

[73] Assignee: Konan Camera Research Institute, Japan

[22] Filed: Apr. 18, 1973

[21] Appl. No.: 352,462

[30] Foreign Application Priority Data

| | | |
|---|---|---|
| Apr. 20, 1972 | Japan | 47-39932 |
| Apr. 25, 1972 | Japan | 47-41520 |
| July 25, 1972 | Japan | 47-74306 |

[52] U.S. Cl. .............................. 178/6.8; 346/74 CR

[51] Int. Cl. .......................... H04n 1/00; H04n 5/76

[58] Field of Search ..... 178/6, 6.8, 7.1, 7.2, DIG. 1, 178/DIG. 37, 6.7 R, 6.7 A, 7.4; 346/74 CR

[56] References Cited

UNITED STATES PATENTS

| | | | |
|---|---|---|---|
| 2,632,801 | 3/1953 | Donaldson | 178/DIG. 1 |
| 2,967,211 | 1/1961 | Blackstone et al. | 178/6.7 R |
| 3,294,903 | 12/1966 | Goldmark et al. | 178/7.6 X |
| 3,678,189 | 7/1972 | Oswald | 178/DIG. 1 |
| 3,761,623 | 9/1973 | Hara et al. | 178/DIG. 1 |

*Primary Examiner*—Robert L. Richardson
*Attorney, Agent, or Firm*—Craig & Antonelli

[57] ABSTRACT

A photo-images recording system for obtaining a continuous series of photographs produced on the surface of a photosensitive recording paper, wherein the position of an object being photographed relative to a television camera is changed, either by change of position of said object or said camera or by placing a moving optical means between said object and said camera, the amount of said change is converted to a corresponding pulse repetition frequency, the sweep of said television camera carries out a constant reciprocating scan on a straight line crossing said object, the video signals of said television camera are converted to optical signals by means of a photo-fibre memory tube for the purpose of recording on the surface of a photosensitive recording paper which is moved perpendicularly past said memory tube, and the sweeps of the television camera and the memory tube and the moving speed of the recording paper are synchronized with the pulse repetition frequency corresponding to the change of relative position between the television camera and the object, thereby to produce on the surface of said paper a photo-image corresponding to said object scanned by said camera tube.

11 Claims, 7 Drawing Figures

SYSTEM FOR RECORDING PHOTO-IMAGES OF AN OBJECT

Figure 1:
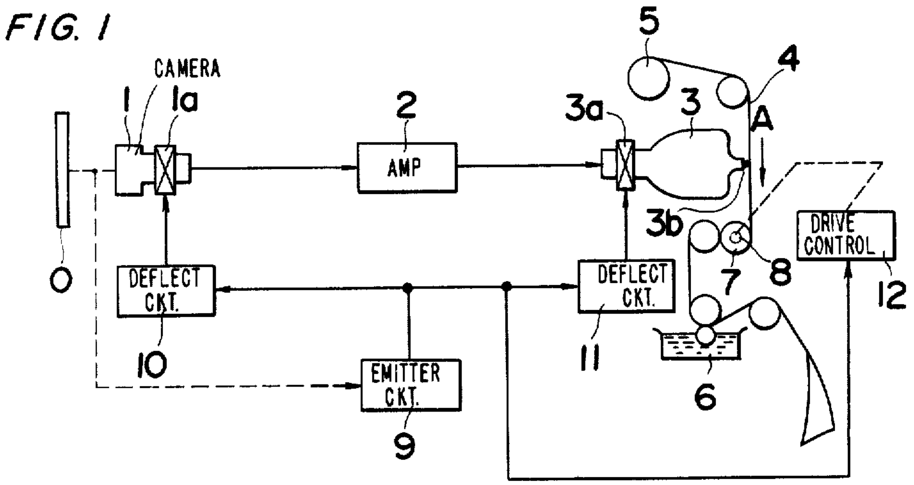

The present invention relates to a system for the single operation recording of the photo-image of an object desired to photograph and, more particularly, to a system whereby a photo-image of one or several objects can be obtained in a continuous record in a short time.

For taking single frame phtographs there are available many types of cameras of high technical standard. However, although these cameras are perfectly satisfactory for some purposes, they have limitations. For example, if the object it is desired to photograph is larger than can be contained within one film frame, such as a panaroma, or when it is desired to produce trick phtographs, a series of photographs have to be taken, edited and then joined together. This is not only a long and expensive procedure, but also, even when extreme care is taken, there are often slight overlaps or gaps between the component shots which spoil the effect. Therefore, for both professional and amateur photographers, there is a need for a system for producing cheaply and in one operation a series of photographs on a single print.

It is an object of the present invention to answer this need by providing a system wherein means are provided for adjustment of the position of a television camera scanning on a plane in correspondence with variations in the relative position between the television camera and objects being photographed, video signals received are applied to an image reproducing means, such as a photosensitive memory tube, etc., in order to obtain production of an image through photoelectric exchange, the positional changes of the camera, the operation connected with the image producing means and the feed of the necessary photosensitive material all being synchronized, thus making it possible to obtain a required phtograph cheaply, in one operation and on one print, even when it is necessary to vary the position of either the television camera or the object being photographed.

It is another object of the present invention to provide a photo-image recording system wherein simultaneously with linear scanning of an object to be photographed by a television camera the image of the object relative to said camera is caused to move by an optical means in a direction that intersects the direction of said camera linear scanning, video signals produced by said camera in response to an image viewed thereby are supplied to a video signal recording means which scans a recording material between which and said video signal recording means there is relative motion in a direction that intersects the direction of said video signal recording means scanning, and output produced by said video signal recording means in response to said camera tube video signals is applied to said recording means.

It is still another object of the present invention to provide a system for the recording or obtaining the photo-image of the interior of a pipe as a continuous image, said system comprising an arrangement whereby a right angled prism inserted in a pipe the interior of which it is desired to photograph and positioned on the longitudinal axis of the pipe, an image of the pipe interior is passed through the right angled prism then through a Wollaston prism and then collected in an image pickup tube, that is, a television camera and during this scanning of the pipe interior the right angled prism is rotated once while the Wollaston prism is rotated simultaneously one half-turn, the movement of each from one spot to the next of the linearly scanned being at right angles to the longitudinal axis of the pipe, this movement is converted to pulses whose repetition frequency corresponds to the amount of movement and the scanning speed of the image pickup tube is synchronized with the pulse repetition frequency and the video signals output corresponding to the pipe interior image of the image pickup tube is applied to a memory tube whose scanning speed also corresponds to the above-mentioned pulse repetition frequency, and the output of the memory tube being applied to and causing reproduction of the pipe interior image on a recording material, the recording material being positioned at right angles to the memory tube and the relative movement between the memory tube and the recording material also being synchronized with the above-mentioned pulse repetition frequency.

A further object of the present invention is to provide a photographing system as described above, wherein a distortion-free image is obtained whatever the speed of positional change of either the camera or the object being photographed.

A further object of the present invention is to provide a photographic system as described above wherein positional changes of either the camera or the object being photographed cause changes in a pulse repetition frequency so that adjustments as described above are carried out accurately and an exact photo-image is obtained.

A further object of the present invention is to provide a system as described above whose construction is simple and which is easy to a manufacture and in which the means for detecting positional changes and the means for producing pulses corresponding to these changes can be one unit or constructed separately.

A further object of the present invention is to provide a system as described above wherein, except when the positional changes are completely without order, the position of the camera is changed so that it is possible to obtain a desired photo-image even if the positional change of the camera or the object being photographed is not on a plane, for example, if it is rotatory.

A further object of the present invention is to provide a system as described above wherein synchronized feed of the necessary photosensitive material can either be continuous or in sections.

A further object of the present invention is to provide a photographic recording system using only the construction of the present invention or the construction together with suitable accessories in order to produce a wide variety of photographs.

A further object of the present invention is to provide an improved system for obtaining a record containing separate or adjoining photo-images of different parts of a same object or of different objects in a simple continuous operation using only simple equipment by merely controlling the movement of a prism or other optical means.

A further object of the present invention is to provide a system for easily obtaining a continuous image of the inner wall of a pipe or hole or channel whereby a conic or spherical mirror is unnecessary and that there is no distortion of different portions of the image.

Figure 2:
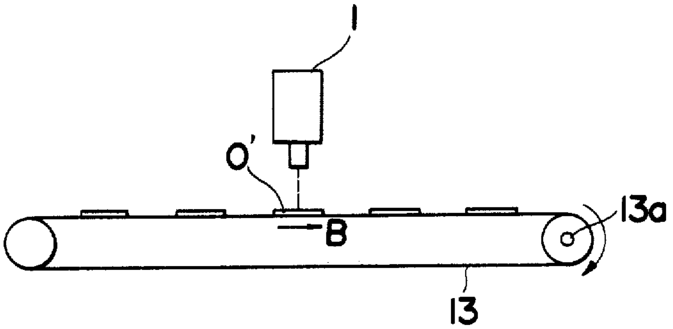
Figure 3:
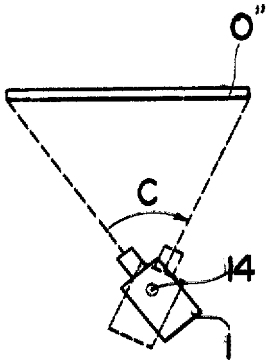
Figure 4:
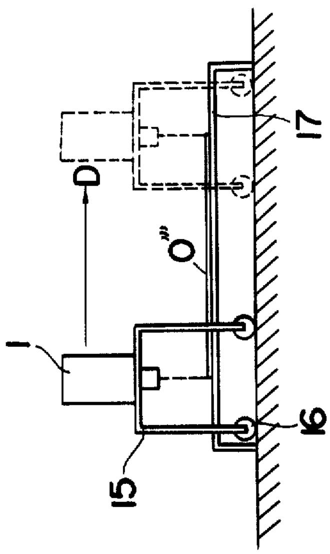
Figure 5:
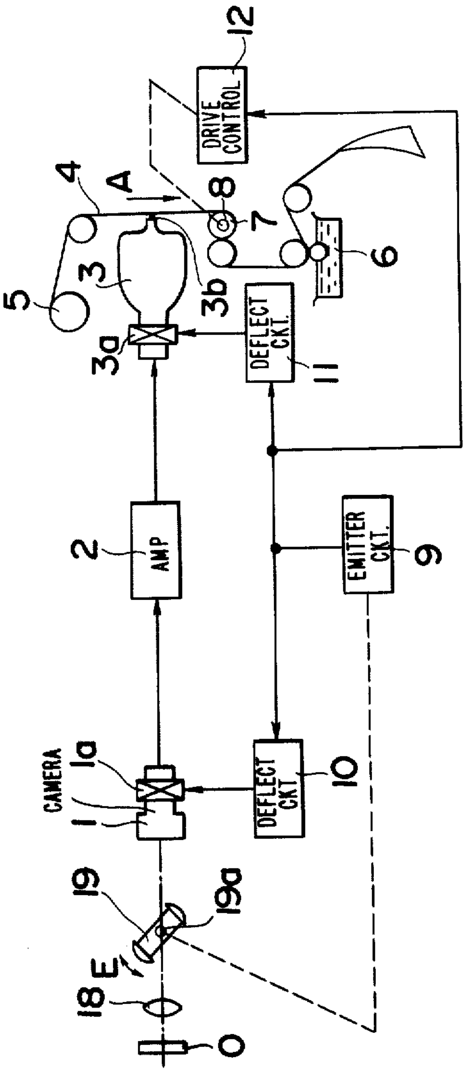
Figure 6:
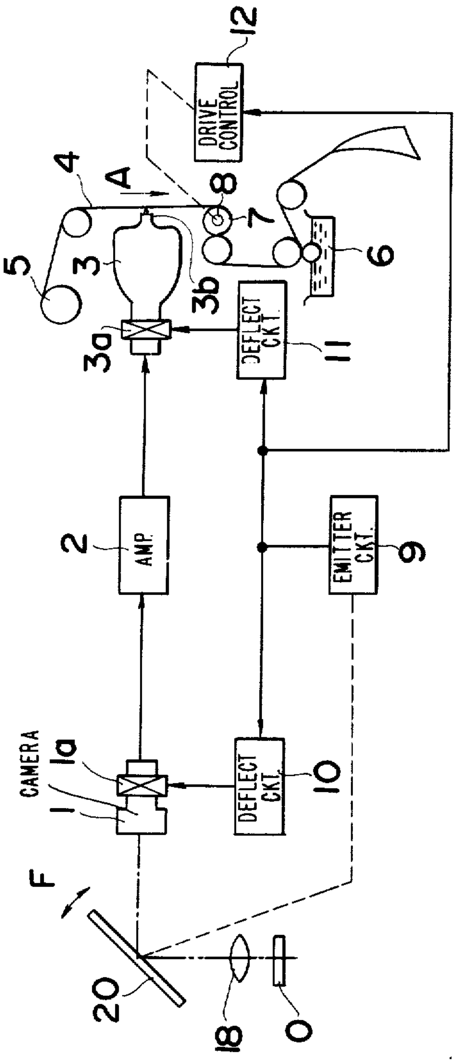
Figure 7:
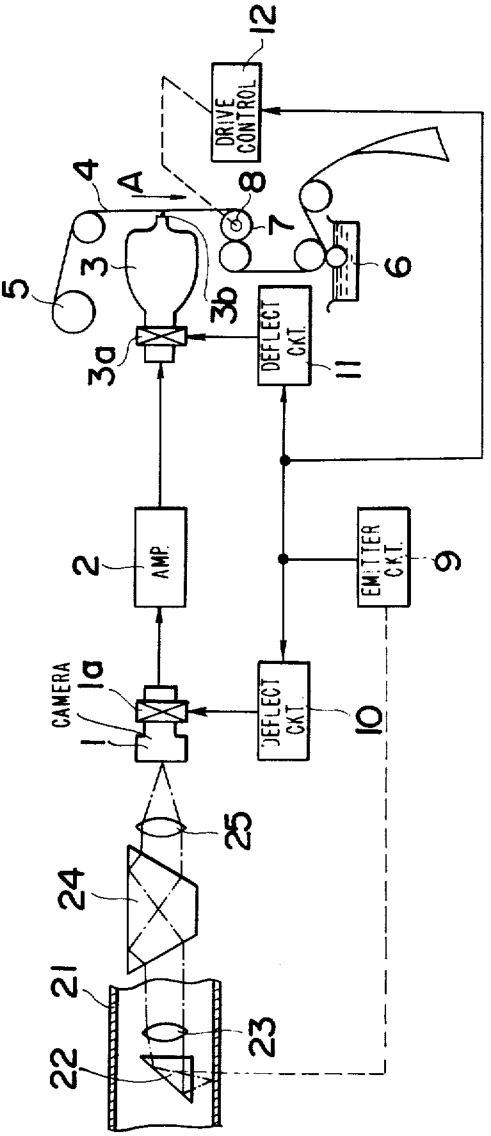

These and other objects and features of the present invention will become apparent from the following description taken in conjunction with preferred embodiments thereof with reference to the accompanying drawings, in which;

FIG. 1 is a block schematic diagram of one embodiment of the present invention,

FIG. 2 is an explanatory front view showing the relation between an object to be photographed and an image recording device of FIG. 1, FIG. 3 is an explanatory plan view showing another embodiment of FIG. 2, FIG. 4 is an explanatory front view showing a further embodiment of FIG. 2, FIG. 5 is a block schematic diagram of another embodiment of the present invention, FIG. 6 is a block schematic diagram of a further embodiment of the present invention, and FIG. 7 is a block schematic diagram of a still further embodiment of the present invention.

Before the description proceeds, it is to be noted that like parts are designated by like reference numerals throughout the accompanying drawings for the sake of brevity.

Referring first to FIGS. 1 to 4, the photo-image recording system to which the present invention is applicable comprises essentially a television camera tube 1 which is directed to an objective o that is an object to be photographed, a video amplifier circuit 2 for amplifying the image signals of the output of the camera tube 1, a photosensitive fibre memory tube 3 to which is applied the output of the amplifier circuit 2, a photo-recording paper 4 on which surface is exposed to the memory tube 3 electron beam and which is transferred from a drum 5 to a developing unit 6 by means of rollers 7 driven by a motor 8, a timing pulse emitter circuit 9 including a rotatory encoder for generating digital pulse signals in connection with the amount of rotation or angular displacement of the camera tube 1 or the object O, a first deflection circuit 10 which is supplied an input from the timing pulse emitter circuit 9 and in response, produces a saw-tooth wave output for deflection of a deflection coil 1*a* of the camera tube 1, a second deflection circuit 11 which is supplied an input from the timing pulse emitter circuit 9 and, in response, produces a saw-tooth wave output for deflection of a deflection coil 3*a* of the memory tube 3, and a control circuit 12 which is supplied an input from the timing pulse emitter circuit 9 and, in response, controls the rotation speed of the motor 8.

The camera tube 1 is a linear scanner type of conventional design which has a scanning range at least equal to the length of the line covered by the object at a point of the object at which it is desired to obtain a record of the portions of the object relative to the others, for example at the beginning or terminal of the object. Although the sweep of the camera tube 1 electron beam is only linear, the breadth of the sweep thereof, that is, the scanning line width can be adjusted to any value in connection with the variation of the saw-tooth wave controlling the camera tube deflection coil 1*a*. The camera tube 1 is caused to scan on a plane upon application of a deflection current to either its horizontal or its vertical deflection coil 1*a*, and the speed of scanning depends on the speed of rotation or angular displacement of the camera tube or the object through the timing pulse emitter circuit 9 so as to be fast when the amount of rotation or angular displacement of the camera tube or the object relative to each other is large, and slow when the amount of rotation or angular displacement of the camera tube or the object is small. The video amplifier circuit 2 amplifies the output of the camera tube 1 which is supplied to the memory tube 3.

The electrostatic memory tube 3 received the output of the amplifier circuit 2 has a photo-fibre plate 3*b* positioned at its output end and produces and electron beam which sweeps the photo-fibre plate linearly and lengthwise as optical signals. The memory tube 3 is also equipped with a deflection coil 3*a* on which is impressed a saw-tooth wave output from the second deflection circuit 11; the second deflection circuit 11 has the same structure as the first deflection circuit 10, and also the same input, that is timing pulses, from the timing pulse emitter circuit 9. Having the same structure and receiving the same input, the first and second deflection circuits 10, 11 therefore produce the same saw-tooth wave output. In other words, since the deflection coils 1*a*, 3*b* of both the camera tube 1 and the memory tube 3 simultaneously have impressed the same saw-tooth wave, the sweep of the electron beam of the memory tube 3 is synchronized with that of the camera tube 1 electron beam. On application of a deflection current the memory tube 3 causes a scanning beam to be moved in the direction of the length of the photo-fibre plate 3*b*, the speed of scanning being controlled in the same manner as in the case of the camera tube 1, i.e., it is arranged to be fast when the speed of rotation or angular displacement of the camera tube or the object is fast, and slow when the speed of rotation or angular displacement of the camera tube or the object is slow in connection with the timing pulse emitter circuit 9.

The photo-recording paper 4 is moved by and approximately perpendicular to the long axis of and in motion relative to the memory tube 3 from the drum 5 to the developing unit 6 by means of the rollers 7 driven by the motor 8 in the direction indicated by the arrow A. The recording paper 4 is driven by means of a variable-speed motor 8 which controls the unwinding of a drum 5 around which the recording paper 4 is originally wound, and of rollers 7 around which the recording paper 4 is passed. When in operation, the motor 8, accordance with the amount of time and the speed at which it runs, causes a certain length of the recording paper 4 to be unwound from the drum 5, and guided past and in contact with the memory tube face-plate 3*b*, and thence to a developing and fixing section unit 6. A commercial quick industrial paper or similar material which requires only seconds for developing can be used as the photo-recording or photo-sensitive paper which means that photo-records are obtained rapidly, and economically. Also, the means for supplying and moving the photo-recording paper can any conventional means, for example the drum and rollers, and the paper is moved past in front of the photo-fibre plate of the memory tube 3 at a certain speed controlled by means of the control circuit 12 to which timing pulses of the timing pulse emitter circuit 9 are applied for controlling the speed of the motor 8. After the paper 4 has been exposed to the memory tube electron beam which corresponds to the photo-image scanned by the camera tube 1, it is transported to the developing unit of conventional type, where the images received on the surface of the paper 4 are immediately developed. Acting through the photo-fibre plate of the memory tube 3, the video signals received at the memory tube produce a straited photo-image on the photo-recording paper 4 while the paper is moved step by step at every scanning of the camera tube 1. The paper 4 is moved past the end of the memory tube 3 and therefore successive photo-images of successive portions of the object o passing the location being scanned by the camera tube 1 are imparted to successive portions of the paper 4 in the direction opposite to moving direction of the paper 4, which thus provides a complete record of all portion of the object o at the end of the photographing by the camera tube 1.

The control circuit 12 controls the rotation speed of the motor 8 according to whether the timing pulse repetition frequency of the timing emitter circuit 9 is high or low; if the timing pulse repetition frequency is high the rotation speed of the motor 8 is made correspondingly high and if the timing pulse repetition frequency is low the rotation speed of the motor is made low. Therefore, the moving speed of the paper 4 depends on the value of the timing pulse repetition frequency of the timing pulse emitter circuit 9 and is synchronized with the sweep of the electron beam of the memory tube 3. Accordingly, in this system there is complete synchronization of the period of the saw-tooth wave applied to the deflection coil 1*a* of the camera tube 1, of the period of the saw-tooth wave applied to the deflection coil 3*a* of the memory tube 3, and the time required for one length of the paper 4 to pass in front of the memory tube 3.

The timing pulse emitter circuit 9 is a means of a kind, for example, a rotary encoder which is an analog-digital converter which converts the input, that is, the amount of rotation or angular displacement of the camera tube 1 or the object O to be photographed relative to each other, which is an analog quantity, to timing pulse signals, which is a digital quantity, corresponding to the amount of rotation or angular displacement of the camera tube 1 or the object O. The timing pulse emitter circuit 9 is applied to any embodiment in accordance with the movement in the relative position between the image recording device of the present invention and the object O to be photographed.

Several embodiments for giving an explanatory description of the movement, i.e., rotation or angular displacement of the image recording device including the television camera tube 1 or of the object O being photographed is discussed below.

FIG. 2 illustrates a fixed image recording device 1 opposite an object O' be photographed, for example, a letter or package, valuable document, or luggage at an airport or goods being loaded on a ship, placed on a conveyor belt 13 which moves by a conventional driving means (not shown) in the direction indicated by the arrow B. In this situation the conveyor belt drive shaft 13*a* and the rotary encoder 9 input shaft are connected so as to rotate synchronized with each other. The rotary encoder 9 converts the input, that is, the amount of rotation of its input shaft, which corresponds to that of displacement of the conveyor belt 13, to pulse signals which are supplied to the first deflection circuit 10, the second deflection circuit 11 and the control circuit 12 of FIG. 1. The camera tube 1 is placed at a certain position above the conveyor belt 13, so that it scans a line covering a location which is approximately perpendicular to the moving direction of the conveyor belt 13. If the scanning direction of the camera tube 1 is vertical with respect to the plane of the drawing in FIG. 2, the scanning on a plane of the camera tube 1 corresponds to a normal television camera horizontal scan, and the unidirectional movement of the object O' to be photographed to a vertical scan. Therefore, when the whole of the object to be photographed has passed along the line of the planar scan of the camera tube 1 in accordance with the movement of the conveyor belt 13, its whole image is recorded on the recording paper 4.

FIG. 3 illustrates the situation where the object O'' to be photographed, for example, a blackboard, is fixed and the image recording device 1 moves around a shaft 14 by means of a motor (not shown) in the direction indicated by the arrow C. In this situation, the rotary encoder 9 is caused to rotate by the rotation of the image recording device 1 and converts the input, that is, the amount of rotation of the shaft 14, which corresponds to that of rotation of the image recording device 1, to pulse signals which are supplied to the first deflection circuit 10, the second deflection circuit 11 and the control circuit 12 of FIG. 1. If the direction of the planar scan of the camera tube 1 is vertical with respect to the plane of the drawing in FIG. 3, the planar scan of the camera tube 1 corresponds to a normal television horizontal scan, and the rotatory movement of the image recording device 1 to a vertical scan. Therefore, if the line of the planar scan of the camera tube 1 passes from the right edge to the left edge of the object O'' to be photographed in accordance with the rotatory movement of the image recording device 1, the whole of the object to be photographed, for example, writing, symbols, or figure on a blackboard, is recorded on the recording paper 4.

FIG. 4 illustrates the situation where the image recording device 1 is placed on a movable frame 15, which has wheels 16, so that the whole can move by a conventional driving means (not shown) in the direction indicated by the arrow D above an object O''' to be photographed, for example, rolled steel sheet, placed on a frame 17. In this situation, the input shaft of the rotary encoder 9 is connected to the axle shaft of the wheels 16 and the rotary encoder a converts the input, that is, the amount of rotation of its shaft, which corresponds to that of displacement of the image recording device 1, to pulse signals which in response are supplied to the first deflection circuit 10, the second deflection circuit 11 and the control circuit 12 of FIG. 1. If the direction of planar scan of the camera tube 1 is vertical with respect to the plane of the drawing in FIG. 4, the planar scan of the camera tube 1 corresponds to a normal television horizontal scan and the unidirectional movement of the image recording device 1 to a vertical scan. Therefore, if the line of the planar scan of the camera tube 1 passes from the left edge to the right edge of the object O''' to be photographed 1, the whole of the object to be photographed, for example, the surface condition of rolled steel sheet, is recorded on the recording paper 4.

As is clear from the description of the above embodiments, the present invention provides means for control whereby when any change in relative position between a television camera tube and an object being photographed, whether is caused by positional change of the camera tube or of the object, by means of an analog-digital converter device, such as a rotary encoder, etc., converted to pulses, whose repetition frequency causes synchronization of the camera and the photosensitive fibre memory tube sweep speed and the feed speed of photosensitive printing paper to be maintained. This, in the present invention, a correct photograph of an object is always obtained, since whether the change in relative position between the camera and object is large or small the scanning speed of the camera and the memory tube and the feed speed of the printing paper are correspondingly adjusted so that the image recorded is not distorted in any way but is always a correct image of the object photographed.

In another embodiment of the present invention, shown in FIG. 5, although a camera tube scans an object only horizontally both vertical and horizontal scanning of an object is effected, by simply placing a prism or other optical means between the camera tube and object and controlling the rotation of the prism or other optical means to cause it to move in a direction that intersects the lines along which is directed the horizontal scanning of the camera tube. It is also to be noted that like elements of the system in FIGS. 1 and 5 designate like numbers and eliminate, for the sake of brevity, the detailed explanation thereof.

FIG. 5 illustrates the situation where the camera tube 1 is directed to an object o to be photographed and between the object O and the camera tube 1 there is a focusing lens 18. Positioned between the focusing lens 18 and the camera tube 1 there is a rotating prism 19 whose axis 19*a* of rotation lies on the optical axis of the lens 18 and which can be tilted towards or away from the object O by means of a motor (not shown) as shown by the arrow E in the drawing, but only in alignment with the lens 18 optical axis; that is the axis of rotation of the prism 19 is always at right-angles to the optical axis of the lens 18 and displacement of the prism 19 relative to the optical axis of the lens 18 may be vertical, but not lateral. Thus tilting the prism 19 causes successive portions of the image of the object O from top to bottom or vice versa to be directed to the lens 18, and thus to the camera tube 1; in other words seen from the camera tube 1 the object O is scanned both vertically and horizontally, even through the camera tube 1 is carrying out only horizontal scanning. The input shaft of the rotary encoder 9 is mechanically linked with the means for rotating the prism 19, and the pulse repetition frequency of the rotary encoder 4 output is controlled by the speed of rotation of the rotating prism 19: also since camera tube deflection circuit 10, the photo-fibre memory tube deflection circuit 11, and the motor speed-control circuit 12 are controlled by the rotary encoder 9 output, scanning speed of the camera tube 1 and photo-fibre memory tube 3, and rotational speed of the motor 8 are all synchronized with and vary directly in response to the rotation speed of the rotating prism 19.

In operation of the above-described device, if scanning by the camera tube 1 is the same as normal television camera horizontal scanning, and is on the optical axis of the object lens 18, that is, vertical with respect to the plane of the drawing in FIG. 5, from the point of view of the camera tube 1 vertical scanning of the object O is effected by the image of the object O being vertically displaced, as the prism 19 is rotated. Also, if scanning of the photo-fibre memory tube 3 is horizontal, as in a normal cathode-ray tube for receiving images, vertical scanning of the recording paper 4 is effected by the paper 4 itself moving past the face-plate 3*b*. Thus in photo-recording, the object O is scanned vertically and horizontally by the rotation of the prism 19 and horizontal scanning of the camera tube 1, and the recording paper 4 is scanned horizontally and vertically by the horizontal scanning of the memory tube 3 and the movement of the paper 4 past the memory tube 3 and at right angles to the direction of the scanning line thereof, and also at a speed that is adjusted to match the synchronized scanning speed of the camera tube 1 and the memory tube 3; the paper 4 thus receives an electrostatic photo-image of the scene or object scanned by the camera tube 1 and is carried to the developing unit 6, for developing and fixing of the photo-image received. As described earlier, vertical and holizontal scanning by the camera tube 1, horizontal scanning by the memory tube 3 and feed of the recording paper 4 are all synchronized, and continue while the prism 19 continues to rotate, and stop when the prism 19 stops moving.

Instead of a rotating prism of FIG. 5 as a means for causing the image of an object O to be photographed to be moved vertically as viewed from a camera tube 1 is also possible, as shown in FIG. 6, to use a moveable reflecting mirror 20 which pivots about a point that lies on the optical axis of the lens 18 and which can be tilted by means of a motor (not shown) towards or away from the camera tube 1, as shown by the arrow F in FIG. 6, but not in any other direction. In this case, when photographing an object O the camera tube 1 is not aligned with the object O but views the image of the object O reflected from the mirror 20, that is the path of light from the object O to the mirror 20 and the path of the camera tube 1 horizontal scanning beam are at an angle to one another, for example, at right angles. If now the mirror 20 is tilted towards or away from the camera tube 1 it directs the image of successive portions of the object O for viewing by the camera tube 1. This movement of the image of the object O is at right-angles to the horizontal scanning by the camera tube 1, and thus the object O is effectively scanned both horizontally and vertically. When using a mirror 20 instead of a prism, the rest of the elements of the system are the same as described for the embodiment of FIG. 5, and a record of the photo-image of the object O is obtained in the same manner.

In still further embodiment of the present invention, shown in FIG. 7, there is provided a system for obtaining a photo-image of the inside of a pipe whereby the interior of a pipe is scanned linearly with respect to the longitudinal axis of the pipe by collection in an image pickup tube of a pipe inner wall image which passes through a right angled prism positioned in the pipe and on the longitudinal axis of the pipe and a Wallaston prism, the right angled prism being rotated and the Wallaston prism also being rotated simultaneously one half-turn for each complete rotation of the right angled prism, the movement of each linearly scanned spot on in the image of the pipe inner wall thus being at right angles to the longitudinal axis of the pipe and video signals are corresponding video signals are obtained in the image pickup tube such as a television camera tube. Almost elements of the system in FIG. 7 correspond to those of the system in FIG. 1 and eleminate, for the sake of brevity, the detailed explanation thereof.

FIG. 7 illustrates the situation where there is a pipe 21 into which is inserted a right angled prism 22 in such a manner that an image of the inner surface of the pipe 21 is directed along the longitudinal axis of the pipe 21. The image of the inner surface thus transmitted by the right angled prism 22 is passed successively through a lens arrangement 23, a Wollaston prism 24 and a lens arrangement 25, in that order, to be collected on the target surface of an image pickup tube 1. During operation, when the right angled prism 22 is rotated for each complete rotation of the right angled prism by means of a motor (not shown) the Wollaston prism 3 is correspondingly rotated one half-turn, by means of conventional reduction gears (not shown), so that the image of the pipe inner surface 1*a* received at the pickup tube 1 is caused to flow in one direction. The direction of linear scanning is at right angles to the direction of the flow of the pipe inner wall 1*a* image on the target of the pickup tube 1 caused by the rotation of the right angled prism 22 and the Wollaston prism 23, and thus the video signal of the pickup tube 7 is the same as that in Video transmission in a series system. The right angled prism 22, or other optical device, is inserted in the pipe 21, where it is rotated the axis of rotation of the prism being the longitudinal axis of the pipe 21. For each rotation of the prism 22 the Wollaston prism 23 is rotated on half-turn, with the result that the image of each part of the piper inner wall which is passed through the prism 22 is received at the target surface of the pickup tube 1 in a direction at right angles to the linear scanning line, in other words the scanning is vertical, and the output video signal of the pickup tube 1 is the same as the video signal obtained in video transmission in a series system. This video signal is changed by means of the photosensitive fibre memory tube 3 to corresponding light or dark areas to produce a distortion-free image of the pipe inner wall on the recording paper 4. If it is desired to obtain a continuous image of the pipe inner wall it is only necessary to move the right angled prism 22 further into or out of the pipe 21 and rotate it once again. Repeating the action of alternately moving along the pipe 21 and rotating the prism 22 it is possible to obtain a complete continuous image of the pipe inner wall.

As is clear from the above descriptions the system of the present invention fulfils the same functions as conventional system, but with many added advantages. The system of the invention makes it possible to obtain instantenious photo-images in which definition is much greater than is possible with conventional system. Also, the system of the invention can be fully automatic, or it can be provided with various manual controls for adjustments as considered convenient by the objects. Also, transmission from the image receiving means to the image recording means is electrical, and therefore operation is faster and the elements of the system can be separate from one another and in any convenient locations. Also, commercial quick industrial paper or similar materials which require only seconds for developing can be used as the recording material, which means that photo-records are obtained rapidly, and economically. While offering a great improvement over conventional systems, the invention does not require any special circuitry or equipment, but uses only elements that are commercially available, and the system of the invention can simply and cheaply replace a conventional system as a means for obtaining photo-records of the objects.

As explained above, the present invention provides a system in which when there is any change in the relative position between a television camera scanning on a plane and an object being photographed whatever the speed of this change it is possible to obtain an instanteneous image of the object by maintaining a constant between the relative movements of the camera, object and recording material. According to the invention, even if the time of scanning from one end of an object to be photographed to another varies from between, for example about 30 seconds and 1 minute a distortion-free photo-image is obtained, since the speeds of other elements in the system are matched and synchronized with that of rotation or angular displacement of the camera tube or the object, or of the scanning prism, mirror, or other optical means.

A further outstanding advantage of the present invention is that by turning the camera through 360° it is possible to obtain the photograph of a panaroma in one single print, without any difference of size or scale at the centre or edges, or an unrolled view of the inner wall of a tube or pipe.

If required, it is possible to photograph one portion of one object, and them one portion of another object and obtain a record on which the photo-images of the two portions of the two different objects are adjacent to one another and then obtain the assembled photographs on one single sheet of printing paper.

Yet another feature of the present invention is that by prior adjustment it is possible to obtain photographs which are not an exact image of the object photographed, i.e., photographs in which the vertical to horizontal ratios are changed, which is very convenient for operations such as adjusting the length or height of news photographs, or for compensating for shrinkage of coloured portions, in negatives.

Using the system of the present invention is also possible to illuminate the interior of the pipe by means of a beam of light whose angle of incidence to the prism in the pipe is always the same despite rotation of the prism, and so obtain an extremely clear image of any cracks or faults in the pipe inner wall.

The invention thus makes it possible to produce better quality panoramic photographs, trick photographs etc. and since its operation is simple and it is cheap, using only conventional devices, it is a great use also in fields such as industry, business, microphotography medecine, and many others.

While in the description of the non-limiting embodiments above certain elements of the system were described the invention is not limited to a construction using only the elements described. For example, instead of a photosensitive fibre memory tube it is possible to employ a recording Braun tube constructured for the purpose of recording information sent by electronic signals on recording material, for example an electrostatic memory tube, thin wall memory tube, flying spot tube or any other type of cathode-ray tube designed for the purpose of recording information received in the form of electrical signals on a recording material; instead of quick industrial paper as recording material, any material for instanteneous recording of images, for example, diazo or electrostatic recording material; instead of a rotary encoder for converting changes in the relative positive between the television camera and object being photographed to pulse signals, any other analog-digital converter means, such as a linear magnescale etc. Furthermore, in the system of the present invention it is possible to obtain an image of an object while keeping the recording material still and moving the recording memory tube of a photosentitive fibre memory tube, or, if required, by moving both the memory tube and the material relative to one another.

What is claimed is:

1. A photo-image recording system for obtaining a continuous series of photographs produced on the surface of a photosensitive recording material comprising camera tube means for constantly scanning a line covering a location of an object being photographed in which the position of the object relative to the camera tube means changes and for providing an output of video signal indicative of the photographed object, pulse emitter means responsive to the change in relative position between the object and the camera tube means for providing an output signal having a pulse repetition frequency corresponding to the amount of change, image reproducing means for converting the video signal of the camera tube means into optical signals on the surface of a photosensitive recording material, and drive means for moving the recording material in a predetermined direction past the image reproducing means, the pulse emitter means supplying the output signal thereof to the camera tube means, the image reproducing means and the drive means for synchronizing the sweeps of the camera tube means, the image reproducing means and the moving speed of the recording material with the pulse repetition frequency corresponding to the change of relative position between the camera tube means and the object.

2. A system as recited in claim 1, wherein the pulse emitter means comprises a rotary encoder having an input shaft rotated in accordance with the change of relative position between the camera tube means and the object, the rotary encoder converting the amount of rotation of the input shaft thereof into a corresponding pulse repetition frequency provided as the output signal thereof.

3. A system as recited in claim 1, wherein one of the camera tube means and the object is fixedly positioned, the other of the camera tube means and the object being moveable relative thereto, and said pulse emitter means providing an output pulse repetition frequency corresponding to the amount of movement.

4. A system as recited in claim 1, wherein one of the camera tube means and the object is fixedly positioned, the other of the camera tube means and the object being rotatable with respect thereto, and the pulse emitter means providing an output pulse repetition frequency corresponding to the amount of rotation.

5. A system as recited in claim 1, further comprising moveable optical means disposed between the object and the camera tube means for changing the relative position between the object and the camera tube means, the object and the camera tube means being fixedly positioned and the optical means being rotated for causing the image of the object to be directed to the camera tube means, the pulse emitter means providing an output pulse repetition frequency corresponding to the amount of rotation of the optical means.

6. A system as recited in claim 5, wherein the optical means includes an optical member and means for rotating the optical member, the pulse emitter means being mechanically coupled to the drive means for the optical member.

7. A system as recited in claim 6, wherein the pulse emitter means includes a rotary encoder having an input shaft mechanically coupled to the drive means of the optical member, the rotary encoder providing a pulse repetition frequency output signal corresponding to the amount of rotation of the input shaft thereof.

8. A system as recited in claim 7, wherein the camera tube means and the image reproducing means each are provided with a deflection circuit and the drive means for moving the recording material includes an electrical motor and a control circuit for controlling the rotation speed of the electrical motor, the pulse emitter means providing the output signal thereof to the deflection circuit of each of the camera tube means and the image reducing means and to the control circuit for the electric motor so as to synchronize the sweeps of the camera tube means, the image reproducing means and the moving speed of the recording material.

9. A system as recited in claim 5, wherein the optical means comprises a rotating prism.

10. A system as recited in claim 1, wherein the optical means comprises a rotating mirror.

11. A system as recited in claim 5, wherein the optical means comprises a right angled prism positioned in pipe and on the longitudinal axis of the pipe and a Wollaston prism, the right angled prism being rotated and the Wollaston prism also being rotated simultaneously one half-turn for each complete portion of the right angled prism, the movement of each linearly scanned spot on in the image of the pipe inner wall thus being at right angles to the longitudinal axis of the pipe and corresponding video signals being provided by the camera tube means.

* * * * *